United States Patent [19]

Mizuhara et al.

[11] Patent Number: 5,095,759
[45] Date of Patent: Mar. 17, 1992

[54] PLATINUM ELECTRODE BONDED TO CERAMIC

[75] Inventors: Howard Mizuhara, Hillsborough; Toshimasa Oyama, Palo Alto, both of Calif.

[73] Assignee: GTE Products Corporation, Stamford, Conn.

[21] Appl. No.: 531,738

[22] Filed: Jun. 1, 1990

[51] Int. Cl.5 ............................ G01F 1/58; C22C 5/02
[52] U.S. Cl. .................................. 73/861.12; 420/507
[58] Field of Search ..................... 73/861.11, 861.12; 420/467, 507, 508; 219/85.1, 85.14, 85.15, 85.2

[56] References Cited

U.S. PATENT DOCUMENTS

| | | | |
|---|---|---|---|
| 2,239,561 | 4/1941 | Hopps | 420/467 X |
| 3,746,896 | 7/1973 | Gruner | 73/861.12 X |
| 4,486,386 | 12/1984 | Mizuhara | 420/507 X |
| 4,606,978 | 8/1986 | Mizuhara | 219/85.2 X |
| 4,773,275 | 9/1988 | Kalinoski | 73/861.12 |
| 4,912,838 | 4/1990 | Goto et al. | 73/861.12 |

FOREIGN PATENT DOCUMENTS 525267 8/1940 United Kingdom ............... 420/467

Primary Examiner—Charles A. Ruehl
Attorney, Agent, or Firm—James Theodosopoulos

[57] ABSTRACT

A high gold content brazing alloy containing titanium is used to braze a platinum electrode to a ceramic cylinder.

3 Claims, 1 Drawing Sheet

PLATINUM ELECTRODE BONDED TO CERAMIC

This invention concerns the bonding of a platinum electrode to ceramic.

One application for such an electrode is in a magnetic inductive field flow meter which requires a chemically inert electrode hermetically sealed to an electrically insulating and chemically resistant ceramic cylinder.

In a prior art method, a platinum wire was inserted in a hole in a green (unfired) alumina ceramic. Upon sintering, the ceramic would shrink about 15 to 20 linear percent around the platinum wire, forming a seal. However, the method was unreliable; the yield in meeting a helium leak test of less than $10^{-9}$ cc/sec was unsatisfactory.

This invention discloses the use of a high gold content brazing alloy containing titanium for the direct joining of a platinum, or platinum alloy, electrode to ceramic. The joint is hermetic, ductile, oxidation resistant and chemically resistant. The platinum may be alloyed with up to 40% rhodium or iridium.

In this invention the brazing alloy composition is 93 to 98.5 wt.% gold, 1 to 5 wt.% nickel, 0.25 to 2 wt.% titanium. Alternatively, the brazing alloy composition is 90 to 95 wt.% gold, 3 to 7 wt.% palladium, 1 to 5 wt.% nickel, 0.25 to 2% titanium.

Figure 1:
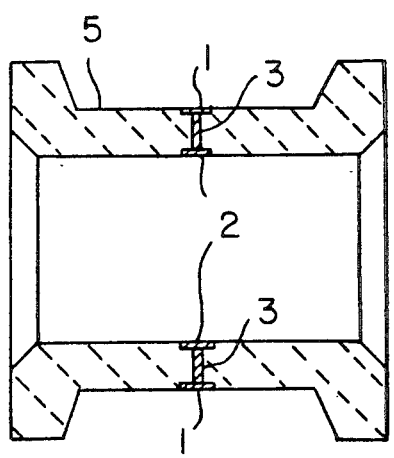
Figure 2:
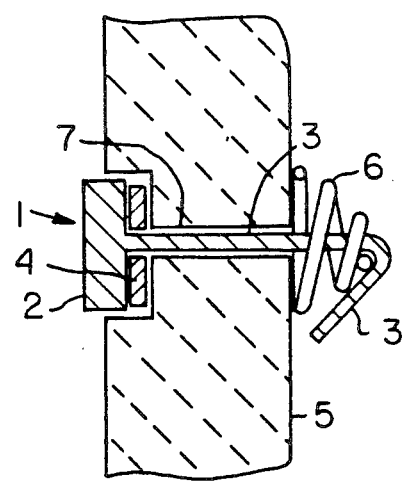

In the drawing, FIG. 1 shows a ceramic cylinder having a pair of opposing platinum electrodes 1 hermetically sealed in the walls of the cylinder 5. FIG. 2 shows an assembly of a platinum electrode extending through the wall of a ceramic cylinder just prior to the brazing step.

In the following examples, all percentages are by weight.

EXAMPLE 1

An alloy 97.5% gold, 2% nickel, 0.5% titanium was cast and rolled to a foil 4 mils thick. A circular preform 4, 175 mils outside diameter by 30 mils inside diameter, was punched from the 4 mil foil. A platinum electrode 1, see FIG. 2, was made by spot welding a platinum disc 2 to a platinum wire 3. Disc 2 was 190 mils diameter by 30 mils thick. Wire 3 was 25 mils diameter by ¾' long. Preform 4 was inserted onto electrode 1 and assembled into alumina ceramic 5, as shown in FIG. 2. A cone shaped tungsten wire spring 6 was slightly compressed and platinum wire 3 was bent thereover to place platinum wire 3 in tension.

The assembly was placed in a vacuum furnace, and brazed at 1050° C. for 10 minutes under $10^{-5}$ torr vacuum. An excellent hermetic bond was made. The hermeticity was checked with helium mass spectrograph. The rate was less than $10^{-9}$ cc/sec.

EXAMPLE 2

A braze similar to that of Example 1 was carried out using an alloy of 92% gold, 5% palladium, 2% nickel and 1% titanium rolled out to 4 mil thick foil. Electrode 1 was made of a platinum alloy, 90% platinum, 10% rhodium. The braze was at 1130° C. for 10 minutes under $10^{-5}$ torr vacuum. The helium leak rate was less than $10^{-9}$ cc/sec.

EXAMPLE 3

A 60% platinum, 40% iridium alloy electrode was successfully brazed to silicon nitride ceramic at 1050° C. under $10^{-5}$ torr vacuum. Silicon nitride has excellent thermal shock properties and can be used with very hot acid solutions under pressure without ceramic failure.

EXAMPLE 4

In this example, a brazing paste was used in order to provide wetting across the total length of the platinum wire to the alumina wall. An atomized minus 325 mesh powder consisting of 98% Au, 2% Ni was mixed in a ratio of 99.5% (98% Au-2% Ni) powder to 0.5% titanium hydride. A low ash gel consisting of 1.25% hydroxypropylcellulose and 98.75% 1,2-propanediol was used. A paste was prepared by mixing 90% of the Au-Ni-titanium hydride powder with 10% of the gel. The paste was applied in hole 7 in ceramic cylinder 5. Platinum electrode 1 was assembled with preform form 4 under disc 2 and with wire 3 coated with paste. The paste was cleaned off the exposed part of platinum wire 3 prior to bending platinum wire 3 around spring 6. The assembly was brazed at 1050° C. under $10^{-5}$ torr vacuum. The leak rate test showed a leak rate less than $10^{-9}$ cc/sec.

We claim:

1. The combination of a platinum electrode and a ceramic cylinder, the platinum electrode being brazed to the ceramic cylinder with a high gold content brazing alloy containing titanium, wherein the platinum electrode consists of a platinum disc welded to a platinum wire, the wire extending through a hole in the ceramic cylinder, and wherein the brazing alloy is applied as a preform under the platinum disc.

2. The combination of claim 1 wherein the brazing alloy is also applied as a paste in the hole and to the platinum wire.

3. The combination of claim 1 wherein the end of the platinum wire extending beyond the hole was bent over a slightly compressed tungsten spring in order to place the platinum wire in tension during brazing.

* * * * *